(12) United States Patent
Ke

(10) Patent No.: US 11,283,355 B2
(45) Date of Patent: Mar. 22, 2022

(54) POWER CONVERSION CIRCUIT AND SIMULATION CURRENT SIGNAL GENERATION CIRCUIT THEREOF

(71) Applicant: uPI semiconductor corp., Zhubei (TW)

(72) Inventor: Bo-Zhou Ke, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 0 days.

(21) Appl. No.: 16/878,659

(22) Filed: May 20, 2020

(65) Prior Publication Data

US 2021/0006159 A1 Jan. 7, 2021

(30) Foreign Application Priority Data

Jul. 3, 2019 (TW) ................. 108208667

(51) Int. Cl.
*H02M 3/158* (2006.01)
*H02M 1/00* (2006.01)
*H02M 3/156* (2006.01)

(52) U.S. Cl.
CPC .......... *H02M 3/158* (2013.01); *H02M 1/0009* (2021.05); *H02M 3/1563* (2013.01)

(58) Field of Classification Search
CPC ... H02M 1/0009; H02M 3/158; H02M 3/1563
See application file for complete search history.

(56) References Cited

U.S. PATENT DOCUMENTS

| 7,045,993 | B1 * | 5/2006 | Tomiyoshi | .......... | H02M 3/1588 323/224 |
| 7,119,522 | B1 * | 10/2006 | Tomiyoshi | .......... | H02M 3/1588 323/224 |
| 7,880,455 | B2 | 2/2011 | Wu | | |
| 8,648,623 | B2 | 2/2014 | Liu et al. | | |
| 9,712,041 | B2 | 7/2017 | Pagano | | |

* cited by examiner

*Primary Examiner* — Rafael O De Leon Domenech
(74) *Attorney, Agent, or Firm* — McClure, Qualey & Rodack, LLP

(57) ABSTRACT

A simulation current signal generation circuit applied to a power conversion circuit is disclosed. The power conversion circuit has an output terminal and includes an output stage, a PWM circuit and an impedance component. One terminal of impedance component is coupled to the output terminal. The generation circuit includes a first current signal circuit, a second current signal circuit and a switching circuit. The first current signal circuit, coupled to another terminal of impedance component, provides a first current signal. The second current signal circuit, coupled to the output stage, senses a current of a power switch in the output stage to provide a second current signal. The switching circuit, coupled to the first current signal circuit, second current signal circuit and PWM circuit respectively, selectively outputs the first current signal or second current signal according to a PWM signal provided by the PWM circuit.

12 Claims, 5 Drawing Sheets

POWER CONVERSION CIRCUIT AND SIMULATION CURRENT SIGNAL GENERATION CIRCUIT THEREOF

BACKGROUND OF THE INVENTION

1. Field of the Invention

The invention relates to power conversion; in particular, to a power conversion circuit and a simulation current signal generation circuit thereof.

2. Description of the Prior Art

Conventionally, in power converter applications with high voltage-converting ratio (the input voltage VIN/the output voltage VOUT) or high-speed switching, since the on-time (TON) of the first power switch in its output stage is very short, it is very difficult to sense current when the first power switch is turned on.

Currently, different methods can be used to obtain the complete output current waveform, such as error amplifier (EA) sensing method, sample-and-hold sensing method, direct current resistance (DCR) sensing method, etc. However, since the EA sensing method determines the current by sensing the voltage difference across the resistor and the sample-and-hold sensing method alternately switches the first power switch (the upper bridge switch) and the second power switch (the lower bridge switch) of the output stage at high speed, they both fail to obtain the real-time output current waveform, and they are not suitable for power converters with high voltage-converting ratio and very short on-time; although the DCR sensing method can sense the real-time output current waveform, it requires additional components and pins, resulting in a complicated circuit and increased cost.

SUMMARY OF THE INVENTION

Therefore, the invention provides a power conversion circuit and a simulation current signal generation circuit thereof to effectively solve the above-mentioned problems in the prior art.

An embodiment of the invention is a simulation current signal generation circuit applied to a power conversion circuit. In this embodiment, the power conversion circuit has an output terminal and includes an output stage, a pulse-width modulation (PWM) circuit and an impedance component. One terminal of the impedance component is coupled to the output terminal. The simulation current signal generation circuit includes a first current signal circuit, a second current signal circuit and a switching circuit. The first current signal circuit is coupled to the other terminal of the impedance component and configured to provide a first current signal. The second current signal circuit is coupled to the output stage and configured to sense a current of a power switch in the output stage to provide a second current signal. The switching circuit is coupled to the first current signal circuit, the second current signal circuit and the PWM circuit respectively and configured to selectively output the first current signal or the second current signal according to a PWM signal provided by the PWM circuit.

In an embodiment of the invention, the simulation current signal generation circuit further includes an output inductor. The output inductor is coupled between the output stage and the output terminal and matches the impedance component.

In an embodiment of the invention, another power switch of the output stage and the power switch are coupled in series between an input voltage and a ground terminal and controlled by a switch control signal related to the PWM signal to be turned on alternately.

In an embodiment of the invention, when the power switch is turned on, the switching circuit outputs the second current signal; when the another power switch is turned on, the switching circuit outputs the first current signal.

In an embodiment of the invention, the first current signal circuit includes a voltage follower and a current mirror circuit and is configured to generate the first current signal with current-type to the switching circuit according to an input voltage and an output voltage of the output terminal.

In an embodiment of the invention, the first current signal circuit includes a voltage follower and is configured to generate the first current signal with voltage-type to the switching circuit according to an input voltage and an output voltage of the output terminal.

Another embodiment of the invention is a power conversion circuit. In this embodiment, the power conversion circuit has an output terminal. The power conversion circuit includes an output stage, a PWM circuit, an impedance component and a simulation current signal generation circuit. One terminal of the impedance component is coupled to the output terminal. The simulation current signal generation circuit includes a first current signal circuit, a second current signal circuit and a switching circuit. The first current signal circuit is coupled to the other terminal of the impedance component and configured to provide a first current signal. The second current signal circuit is coupled to the output stage and configured to sense a current of a power switch in the output stage to provide a second current signal. The switching circuit is coupled to the first current signal circuit, the second current signal circuit and the PWM circuit respectively and configured to selectively output the first current signal or the second current signal according to a PWM signal provided by the PWM circuit.

Compared to the prior art, the power conversion circuit of the invention selects an impedance component matching the output inductance and connects it in series between the output terminal and the simulation current signal generation circuit. The output current (the inductor current) when one of the power switches (such as the upper bridge switch in the buck power converter) in the output stage is turned on can be simulated according to the difference between the input voltage and the output voltage, and it can be combined with the sense current when the other power switch (such as the lower bridge switch in the buck power converter) in the output stage is turned on to output a complete output current (the inductor current) waveform. There is no disadvantage that the real-time output current waveform cannot be obtained when switching at high speed alternately, and no additional components and pins are required, which can reduce circuit complexity and cost.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
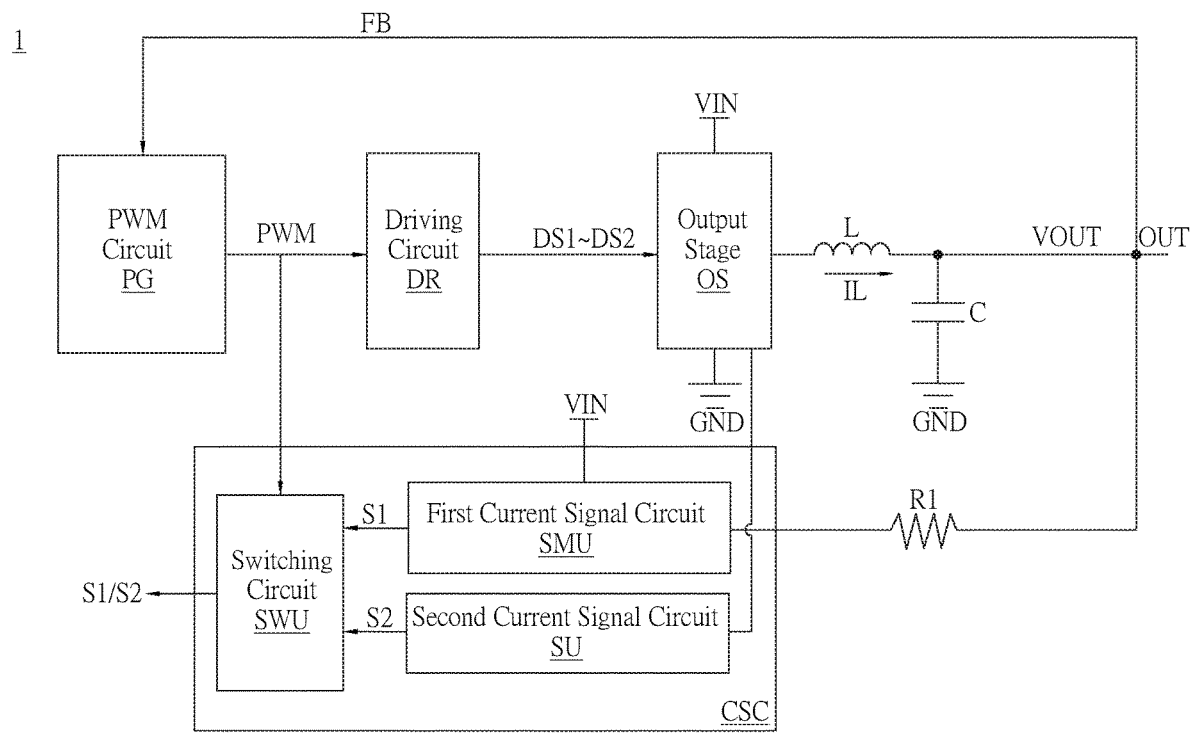
FIG. 1 illustrates a schematic diagram of the power conversion circuit in an embodiment of the invention.

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An embodiment of the invention is a power conversion circuit. In this embodiment, the power conversion circuit can be a buck-type, boost-type or buck-boost-type power conversion circuit, and can be applied to an integrated circuit with current sensing function such as DrMOS, converter, etc., but not limited to this.

Please refer to FIG. 1. FIG. 1 illustrates a schematic diagram of the power conversion circuit 1 in this embodiment. As shown in FIG. 1, the power conversion circuit 1 includes a pulse width modulation circuit PG, a driving circuit DR, an output stage OS, a simulation current signal generation circuit CSC, an output inductor L, a capacitor C, an impedance component R1 and an output terminal OUT.

The pulse width modulation circuit PG is coupled to the driving circuit DR, the output terminal OUT and the simulation current signal generation circuit CSC respectively. The pulse width modulation circuit PG is used for generating a pulse width modulation signal PWM to the driving circuit DR and receiving a feedback signal FB related to an output voltage VOUT from the output terminal OUT to adjust the generated pulse width modulation signal PWM according to the feedback signal FB.

The driving circuit DR is coupled between the pulse width modulation circuit PG and the output stage OS. The driving circuit DR is used for receiving the pulse width modulation signal PWM and generating switch control signals DS1~DS2 to the output stage OS according to the pulse width modulation signal PWM to control the operation of the output stage OS.

The output stage OS is coupled to the driving circuit DR, the output inductor L, the output voltage VIN and the ground GND respectively. The output inductor L is coupled between the output stage OS and the output terminal OUT. The output stage OS is controlled by the switch control signals DS1~DS2 to generate an output current (the inductor current) IL flowing through the output inductor L, and the output voltage VOUT is formed at the output terminal OUT.

One terminal of the capacitor C is coupled between the output inductor L and the output terminal OUT and the other terminal of the capacitor C is coupled to the ground terminal GND. One terminal of the impedance component R1 is coupled to the output terminal OUT and the other terminal of the impedance component R1 is coupled to the simulation current signal generation circuit CSC. The simulation current signal generation circuit CSC is coupled to the pulse width modulation circuit PG, the output stage OS, the impedance component R1 and the input voltage VIN respectively.

The simulation current signal generation circuit CSC includes a first current signal circuit SMU, a second current signal circuit SU and a switching circuit SWU. The first current signal circuit SMU is coupled to the impedance component R1, the switching circuit SWU and the input voltage VIN respectively and used to provide the first current signal S1 to the switching circuit SWU. The second current signal circuit SU is coupled between the output stage OS and the switching circuit SWU and is used to sense a current of a power switch (such as a lower bridge switch in a buck power converter, but not limited to this) in the output stage OS to provide the second current signal S2 to the switching circuit SWU. The switching circuit SWU is coupled to the first current signal circuit SMU, the second current signal circuit SU and the pulse width modulation circuit PG respectively and used to selectively output the first current signal S1 or the second current signal S2 according to the pulse width modulation signal PWM provided by the pulse width modulation circuit PG.

Figure 2:
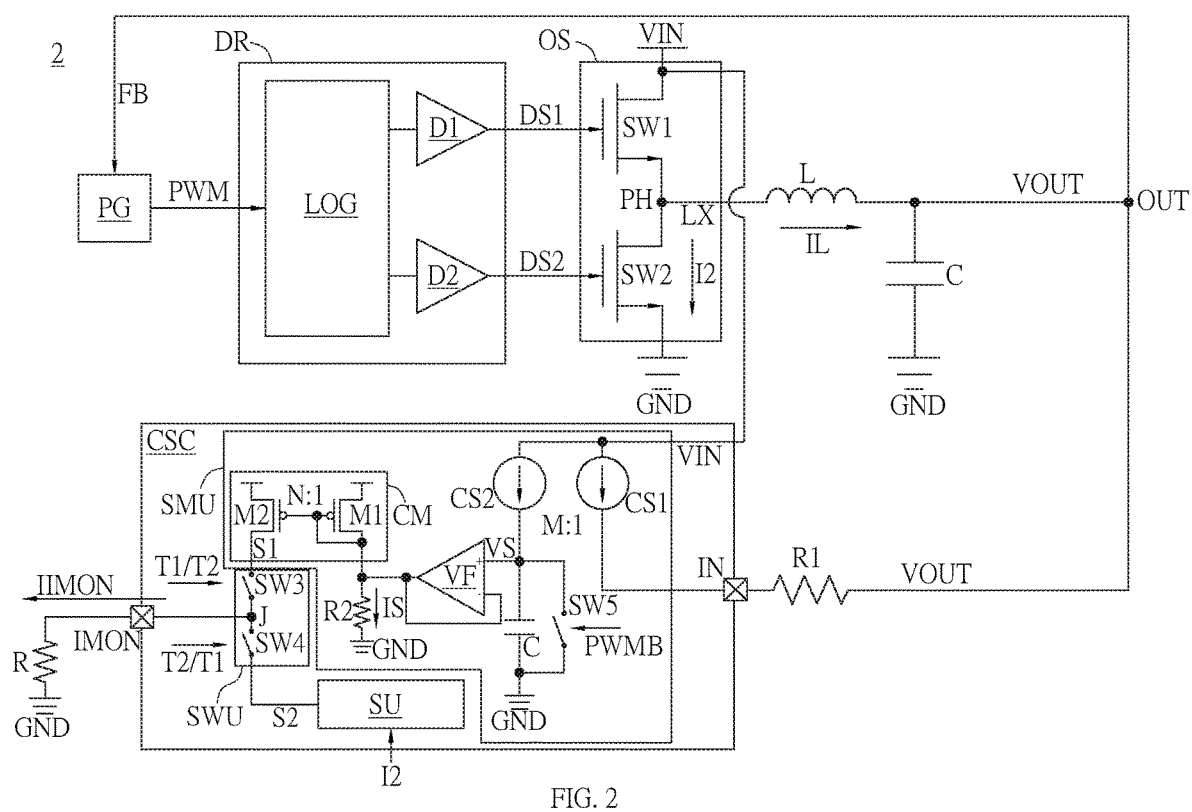
FIG. 2 illustrates a schematic diagram of the simulation current signal generation circuit applied to the power conversion circuit in another embodiment of the invention.

Another embodiment of the invention is a simulation current signal generation circuit applied to a buck power conversion circuit. Please refer to FIG. 2. FIG. 2 illustrates a schematic diagram of the simulation current signal generation circuit CSC applied to the power conversion circuit 2 in this embodiment.

As shown in FIG. 2, the buck power conversion circuit 2 includes a pulse width modulation circuit PG, a driving circuit DR, an output stage OS, a simulation current signal generation circuit CSC, an output inductor L, a capacitor C, and an output terminal OUT and an impedance component R1.

The driving circuit DR includes a logic circuit LOG and drivers D1~D2. The output stage OS includes a first power switch (i.e., an upper bridge switch) SW1 and a second power switch (i.e., a lower bridge switch) SW2 coupled in series between the input voltage VIN and the ground terminal GND. The output inductor L is coupled to a phase node LX between the first power switch SW1 and the second power switch SW2. The driver D1 is coupled between the logic circuit LOG and the gate of the first power switch SW1. The driver D2 is coupled between the logic circuit LOG and the gate of the second power switch SW2.

The logic circuit LOG receives the pulse width modulation signal PWM provided by the pulse width modulation circuit PG and controls the drivers D1~D2 to transmit the switch control signals DS1~DS2 to the gates of the first power switch SW1 and the second power switch SW2 respectively according to the pulse width modulation signal PWM to alternately turn on the first power switch SW1 and the second power switch SW2. That is to say, the first power switch SW1 and the second power switch SW2 in the output stage OS are turned on alternately with each other without being turned on simultaneously.

In this embodiment, the second current signal circuit SU in the simulation current signal generation circuit CSC senses the current I2 flowing through the second power switch SW2 in the output stage OS to generate a second current signal S2 with current-type. In practical applications, when the second current signal circuit SU senses the current I2 of the second power switch SW2, conventional current sensing methods such as error amplifiers or resistors can be used without any specific limitations.

The first current signal circuit SMU in the simulation current signal generation circuit CSC includes a first current source CS1, a second current source CS2, a switch SW5, a capacitor C, a voltage follower VF, a resistor R2 and a current mirror circuit CM.

The first current source CS1 is coupled to the input voltage VIN and is coupled to one terminal of the impedance component R1 through the input pin IN, and the other terminal of the impedance component R1 is coupled to the output voltage VOUT of the output terminal OUT. The second current source CS2 is coupled between the input voltage VIN and a positive input terminal + of the voltage follower VF, and the second current source CS2 is obtained by amplifying the first current source CS1 by M times. The first current source CS1 and the second current source CS2 can also be a current mirror with magnification M. The capacitor C is coupled between the second current source CS2 and the ground terminal GND. The switch SW5 is coupled between the positive input terminal + of the voltage follower VF and the ground terminal GND and in parallel with the capacitor C, and the operation of the switch SW5 is controlled by an inverse signal PWMB of the pulse width modulation signal PWM. When the pulse width modulation signal PWM is at high-level, the inverse signal PWMB of the pulse width modulation signal PWM is at low-level, the first power switch SW1 is turned on and the second power switch SW2 is turned off, the switch SW5 is turned off, and the second current source CS2 will charge the capacitor C to form a voltage VS at the positive input terminal + of the voltage follower OA, and the voltage VS=[VIN−VOUT)*TON]/(R1*C), wherein TON is an on-time of the first power switch SW1.

The resistor R2 is coupled between the current mirror circuit CM and the ground terminal GND. A negative input terminal − and an output terminal of the voltage follower VF are coupled between the current mirror circuit CM and the resistor R2. The output terminal of the voltage follower VF outputs the voltage VS to generate a current IS at the resistor R2, and the current IS is amplified N times (that is, N is the magnification) by the current mirror circuit CM to output the first current signal S1 with current-type to the switching circuit SWU.

The switching circuit SWU includes switches SW3~SW4. The switches SW3~SW4 are coupled in series between the current mirror circuit CM and the second current signal circuit SU, and a node J between the switches SW3~SW4 is coupled to the output pin IMON. The operations of the switches SW3~SW4 of the switch circuit SWU are controlled by the switch control signals T1~T2. The switch control signals T1~T2 are inverse to each other and synchronized with the pulse width modulation signal PWM. For example, when the switch control signal T1 is at high-level, it means that the pulse width modulation signal PWM is at high-level; when the switch control signal T2 is at high-level, it means that the pulse width modulation signal PWM is at low-level, so that the switches SW3~SW4 are alternately turned on.

When the switch SW3 is controlled by the switch control signal T1 to be turned on and the switch SW4 is controlled by the switch control signal T2 to be turned off, the first current signal S1 outputted by the current mirror circuit CM will flow through the turned-on switch SW3 and outputted as a simulated current signal IIMON with current-type by the output pin IMON, and then the simulated current signal IIMON will flow through the external resistor R coupled between the output pin IMON and the ground terminal GND. At the same time, since the switch SW4 is turned off, the second current signal S2 outputted by the second current signal circuit SU will not flow to the output pin IMON.

When the switch SW3 is controlled by the switch control signal T2 to be turned off and the switch SW4 is controlled by the switch control signal T1 to be turned on, the second current signal S2 outputted by the second current signal circuit SU will flow through the turned-on switch SW4 and outputted as a simulated current signal IIMON with current-type by the output pin IMON, and then the simulated current signal IIMON will flow through the external resistor R coupled between the output pin IMON and the ground terminal GND. At the same time, since the switch SW3 is turned off, the first current signal S1 outputted by the current mirror circuit CM will not flow to the output pin IMON.

It can be known from above that in the simulation current signal generation circuit CSC, the first current signal circuit SMU is coupled to the input voltage VIN and coupled to the output voltage VOUT through the impedance component R1, and generates the simulated first current signal S1 to the switching circuit SWU according to the input voltage VIN and the output voltage VOUT; the second current signal circuit SU generates the sensed second current signal S2 to the switching circuit SWU according to the current I2 of the second power switch (the lower bridge switch) SW2 in the output stage OS. The switching circuit SWU selectively outputs the simulated first current signal S1 or the sensed second current signal S2 to the output pin IMON and outputs as the simulated current signal IIMON with current-type.

It should be noted that the reason why the first current signal circuit SMU of the invention simulates the output current (the inductor current) IL according to the output voltage VOUT instead of simulating the output current (the inductor current) IL according to the phase voltage PH of the phase node LX is that the change of the phase voltage PH of the phase node LX is faster than the output voltage VOUT, which cannot be simulated in this way.

Figure 3:
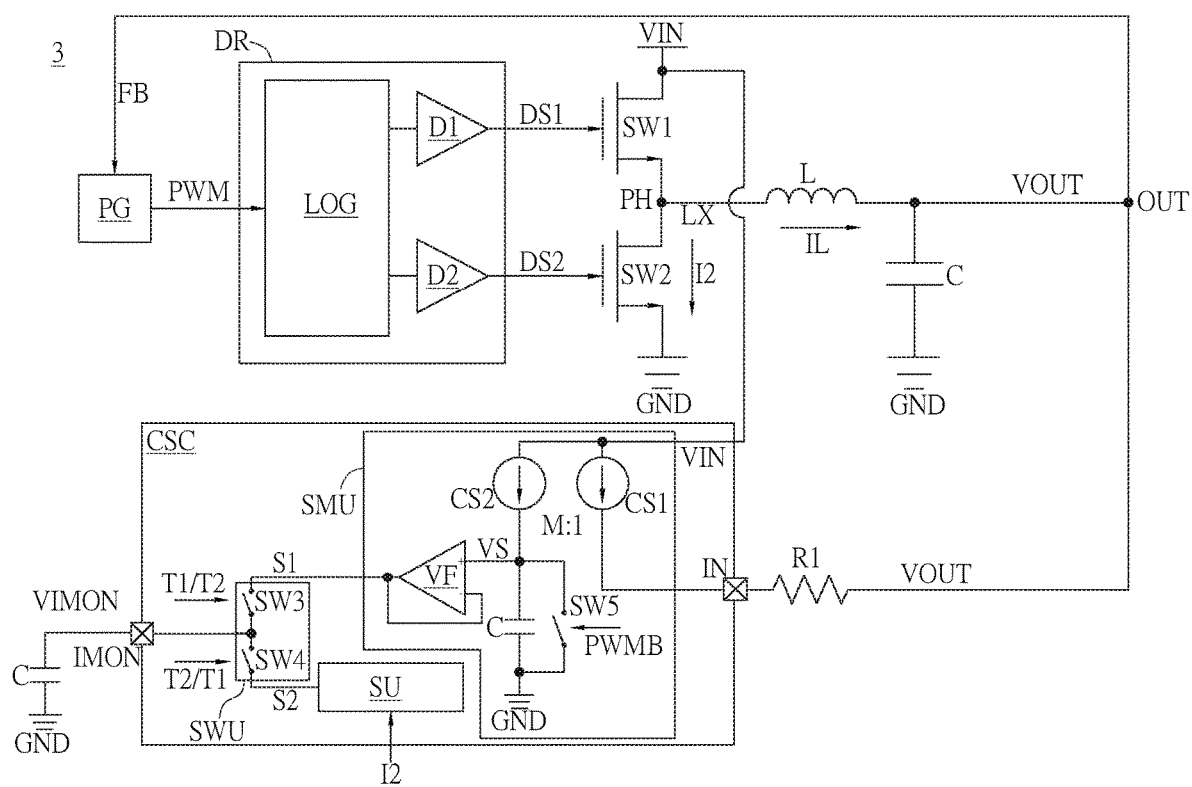
FIG. 3 illustrates a schematic diagram of the simulation current signal generation circuit applied to the power conversion circuit in still another embodiment of the invention.

In another embodiment, as shown in FIG. 3, the simulation current signal generation circuit CSC is applied to the power conversion circuit 3. The difference from the embodiment of FIG. 2 is that the first current signal circuit SMU in the simulation current signal generation circuit CSC of FIG. 3 includes a first current source CS1, a second current source CS2, a switch SW5, a capacitor C and a voltage follower VF.

The first current source CS1 is coupled between the input voltage VIN and the impedance component R1. The second current source CS2 is coupled between the input voltage VIN and the positive input terminal + of the voltage follower VF, and the second current source CS2 is obtained by amplifying the first current source CS1 by M times (that is, M is the magnification). The capacitor C is coupled between the second current source CS2 and the ground terminal GND. The switch SW5 is coupled between the positive input terminal + of the voltage follower VF and the ground terminal GND and in parallel with the capacitor C, and the switch SW5 is controlled by the inverse signal PWMB of the pulse width modulation signal PWM. When the switch SW5 is controlled by the inverse signal PWMB of the pulse width modulation signal PWM to be turned off, the second current source CS2 will charge the capacitor C to form a voltage VS at the positive input terminal + of the voltage follower OA. The negative input terminal − and the output terminal of the voltage follower VF are coupled to the switching circuit SWU, and the voltage follower VF generates a first current signal S1 with voltage-type to the switching circuit SWU according to the voltage VS. The second current signal circuit SU senses the current I2 flowing through the second power switch SW2 in the output stage OS and converts the current I2 to generate a second current signal S2 with voltage-type.

The switching circuit SWU includes switches SW3~SW4. The switches SW3~SW4 are coupled in series between the first current signal circuit SMU and the second current signal circuit SU, and the node J between the switches SW3~SW4 is coupled to the output pin IMON. The switches SW3~SW4 of the switching circuit SWU are controlled by the switch control signals T1~T2. The switch control signals T1~T2 are inverse to each other and related to the level of the pulse width modulation signal PWM. For example, the switch control signal T1 represents that the pulse width modulation signal PWM is at high-level and the switch control signal T2 represents the pulse width modulation signal PWM is at low-level to alternately turn on the switches SW3~SW4.

When the switch SW3 is controlled by the switch control signal T1 to be turned on and the switch SW4 is controlled by the switch control signal T2 to be turned off, the first current signal S1 with voltage-type outputted by the first current signal circuit SMU will form the simulated current signal VIMON with voltage-type at the output pin IMON, and then the simulated current signal VIMON is outputted to an external capacitor C coupled between the output pin IMON and the ground terminal GND.

When the switch SW3 is controlled by the switch control signal T2 to be turned off, and the switch SW4 is controlled by the switch control signal T1 to be turned on, the second current signal S2 with voltage-type outputted by the second current signal circuit SU will form the simulated current signal VIMON with voltage-type at the output pin IMON, and then the simulated current signal VIMON is outputted to the external capacitor C coupled between the output pin IMON and the ground GND.

Figure 4:
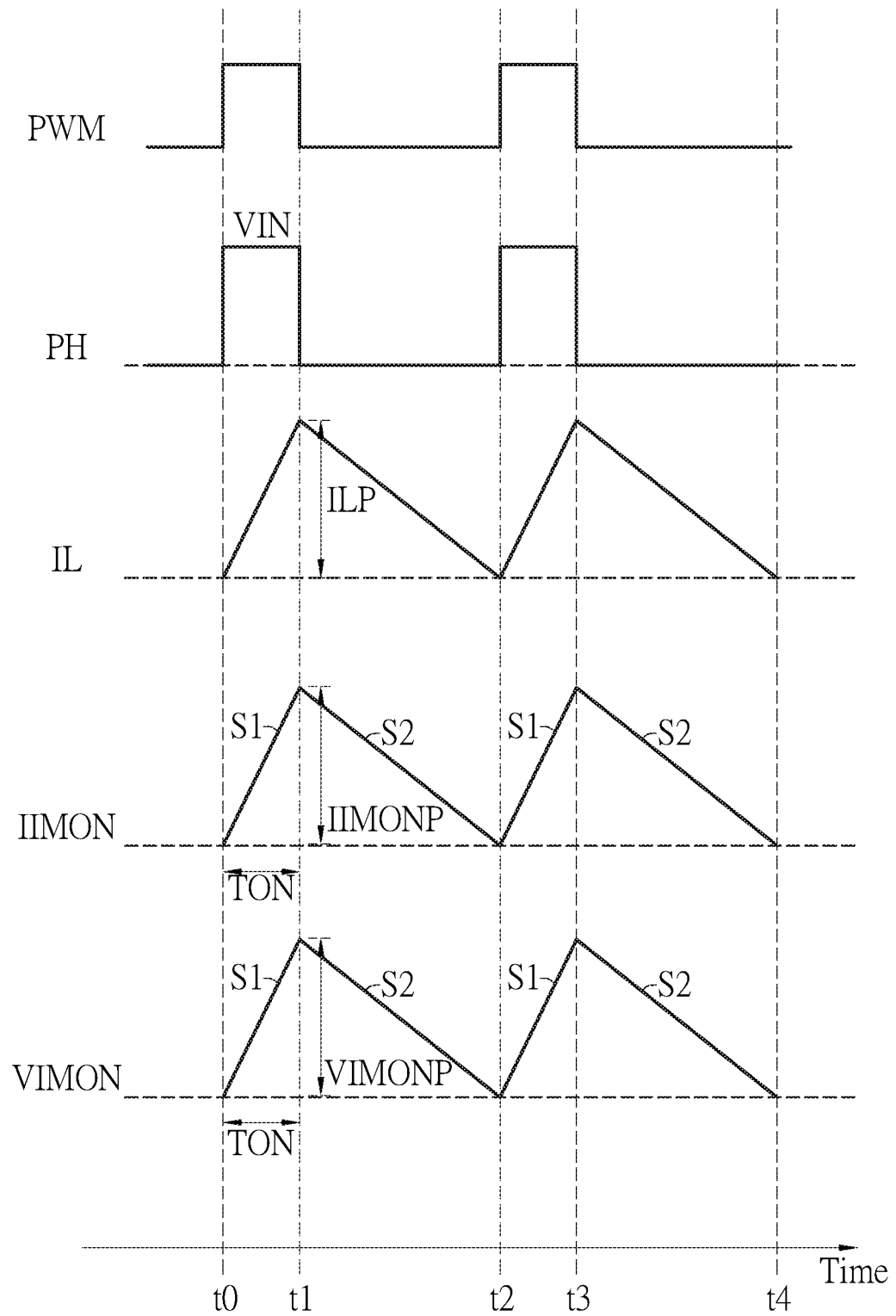
FIG. 4 illustrates timing diagrams of the PWM signal, the phase voltage of the phase node, the output current (the inductor current), the simulation current signal with current-type and the simulation current signal with voltage-type respectively.

Please refer to FIG. 4. FIG. 4 illustrates timing diagrams of the pulse width modulation signal PWM, the phase voltage PH of the phase node LX, the output current (the inductor current) IL, the simulation current signal IIMON with current-type and the simulation current signal VIMON with voltage-type respectively.

As shown in FIG. 4, during the period from the time t0 to the time t1 (that is, the on-time TON of the first power switch SW1), the pulse width modulation signal PWM is at high-level, the first power switch SW1 in the output stage OS is turned on and the second power switch SW2 in the output stage OS is turned off, so that the phase voltage PH of the phase node LX is equal to the input voltage VIN, and the output current (the inductor current) IL will rise linearly from zero to an output current (inductor current) peak ILP.

At this time, the switching circuit SWU in the embodiment of FIG. 2 will output the simulated first current signal S1 as the simulated current signal IIMON current-type, and it will linearly rise from zero to the simulated current signal peak IIMONP with current-type. The switching circuit SWU in the embodiment of FIG. 3 will output the simulated first current signal S1 as the simulated current signal VIMON with voltage-type, and it will linearly rise from zero to the simulated current signal peak VIMONP with voltage-type.

The output current (inductor current) peak ILP=TON*[(VIN−VOUT)/L] and the simulated current signal peak IIMONP=TON*K*[(VIN−VOUT)*(M*N)/(C*R1)], wherein K is a constant. In the embodiment of FIG. 2, when the resistance value of the impedance component R1=K*M*N*L/C, that is to say, the resistance value of the impedance component R1 can match the output inductance L, the simulated current signal peak IIMONP with current-type will be equal to the output current (inductor current) peak ILP. In the embodiment of FIG. 3, when the resistance of the impedance component R1=K*M*L/C, that is to say, the resistance of the impedance component R1 can match the output inductance L, the simulated current signal peak VIMONP with voltage-type will be equal to the output current (inductor current) peak ILP.

In practical applications, after the resistance value selection of the impedance component R1 is completed, a trimming operation should be performed on the system side to confirm that its resistance value can match the output inductance L. In addition, the impedance component R1 can be a metal-oxide-semiconductor field-effect transistor or any other components with impedance, as long as its resistance value can match the output inductance L, and there is no specific limitation.

During the period from the time t1 to the time t2, the pulse width modulation signal PWM is at low-level, the first power switch SW1 in the output stage OS is turned off and the second power switch SW2 in the output stage OS is turned on, so that the phase voltage PH of the phase node LX is Zero, and the output current (the inductor current) IL will linearly decrease from the output current (the inductor current) peak ILP to zero. A current I2 will flow through the turned-on second power switch SW2 in the output stage OS, and the second current signal circuit SU will sense the current I2 flowing through the second power switch SW2 to generate a second current signal S2.

At this time, the switching circuit SWU in the embodiment of FIG. 2 will output the sensed second current signal S2 as the simulated current signal IIMON with current-type, and it will linearly decrease from the simulated current signal peak IIMONP with current-type to zero. The switching circuit SWU in the embodiment of FIG. 3 will output the sensed second current signal S2 as the simulated current signal VIMON with voltage-type, and it will linearly decrease from the simulated current signal peak VIMONP with voltage-type to zero.

From the above, it can be known that during the period from the time t0 to the time t2 (that is, a single cycle), the waveform of the first current signal S1 simulated during the period from the time t0 to the time t1 (that is, the period when the first power switch SW1 is turned on) and the waveform of the second current signal S2 sensed during the period from the time t1 to the time t2 (that is, the second power switch SW2 is on) can be combined to obtain a complete waveform of the output current (the inductor current) IL in the single cycle.

Similarly, the operations in the period from the time t2 to the time t3 and the period from the time t3 to the time t4 will be the same as the operations in the period from the time t0 to the time t1 and the period from the time t1 to the time t2, so please refer to the foregoing description, it will not be repeated here.

In practical applications, when the power conversion circuit of the invention is a power conversion circuit with buck-type, boost-type or buck-boost type, there are slight differences in actual application, which are explained as follows:

(1) In the Buck power conversion circuit, since the current flowing through the first power switch (the upper bridge switch) SW1 and the second power switch (the lower bridge switch) SW2 of the output stage OS are both related to the output voltage VOUT, the simulated first current signal S1 can be selected when the first power switch (the upper bridge switch) SW1 is turned on and the sensed second current signals S2 can be selected when the second power switch (the lower bridge switch) SW2 is turned on, or the simulated first current signal S1 can be selected when the second power switch (the lower bridge switch) SW2 is turned on and the sensed second current signal S2 can be selected when the first power switch (the upper bridge switch) SW1 is turned on based on practical needs.

Figure 5A:
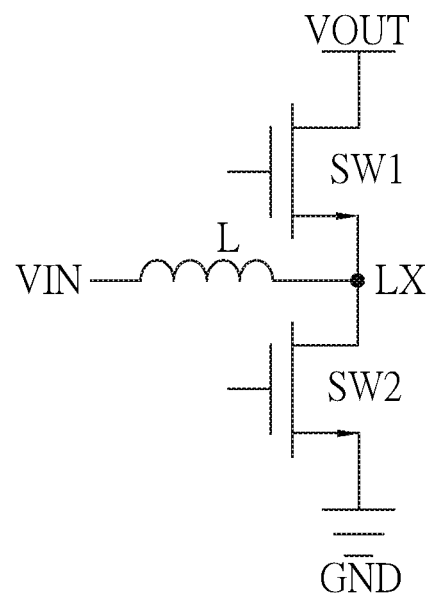
FIG. 5A and FIG. 5B illustrate schematic diagrams of the output stage coupled to the output inductor in a boost power conversion circuit and a buck-boost power conversion circuit respectively.
Figure 5B:
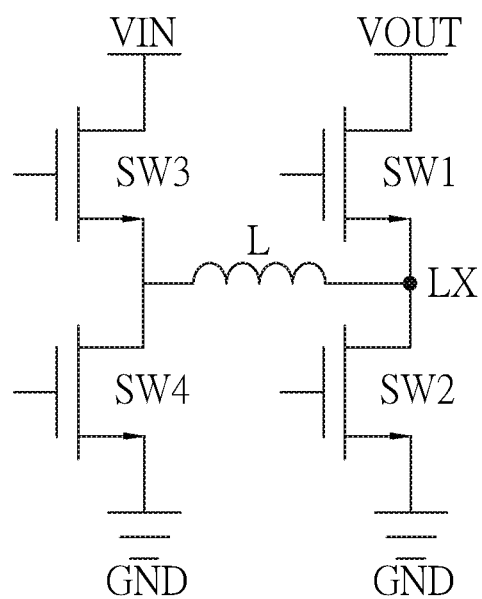

(2) As shown in FIG. 5A and FIG. 5B, in the boost or buck-boost power conversion circuit, since the current flowing through the first power switch (the upper bridge switch) SW1 of the output stage OS has nothing to do with the output voltage VOUT, only the simulated first current signal S1 can be selected when the second power switch (the lower bridge switch) SW2 is turned on and only the sense second current signal S2 can be selected when the first power switch (the upper bridge switch) SW1 is turned on. When the first power switch (the upper bridge switch) SW1 is turned on, the simulated first current signal S1 cannot be selected and when the second power switch (the lower bridge switch) SW2 is turned on, the sense second current signal S2 cannot be selected.

Compared to the prior art, the power conversion circuit of the invention selects an impedance component matching the output inductance and connects it in series between the output terminal and the simulation current signal generation circuit. The output current (the inductor current) when one of the power switches (such as the upper bridge switch in the buck power converter) in the output stage is turned on can be simulated according to the difference between the input voltage and the output voltage, and it can be combined with the sense current when the other power switch (such as the lower bridge switch in the buck power converter) in the output stage is turned on to output a complete output current (the inductor current) waveform.

There is no disadvantage that the real-time output current waveform cannot be obtained when switching at high speed alternately, and no additional components and pins are required, which can reduce circuit complexity and cost.

What is claimed is:

1. A simulation current signal generation circuit applied to a power conversion circuit, the power conversion circuit having an output terminal and comprising an output stage, a pulse-width modulation (PWM) circuit and an impedance component, one terminal of the impedance component is coupled to the output terminal, the simulation current signal generation circuit comprising:
   a first current signal circuit, coupled to the other terminal of the impedance component, configured to provide a first current signal;
   a second current signal circuit, coupled to the output stage, configured to sense a current of a power switch in the output stage to provide a second current signal; and
   a switching circuit, coupled to the first current signal circuit, the second current signal circuit and the PWM circuit respectively, configured to selectively output the first current signal or the second current signal according to a PWM signal provided by the PWM circuit,
   wherein the impedance component is a resistor and the first current signal is a simulated current signal.

2. The simulation current signal generation circuit of claim 1, further comprising:
   an output inductor, coupled between the output stage and the output terminal and matching the impedance component.

3. The simulation current signal generation circuit of claim 1, wherein another power switch of the output stage and the power switch are coupled in series between an input voltage and a ground terminal and controlled by a switch control signal related to the PWM signal to be turned on alternately.

4. The simulation current signal generation circuit of claim 3, wherein when the power switch is turned on, the switching circuit outputs the second current signal; when the another power switch is turned on, the switching circuit outputs the first current signal.

5. The simulation current signal generation circuit of claim 1, wherein the first current signal circuit comprises a voltage follower and a current mirror circuit and is configured to generate the first current signal with current-type to the switching circuit according to an input voltage and an output voltage of the output terminal.

6. The simulation current signal generation circuit of claim 1, wherein the first current signal circuit comprises a voltage follower and is configured to generate the first current signal with voltage-type to the switching circuit according to an input voltage and an output voltage of the output terminal.

7. A power conversion circuit, having an output terminal, comprising:
   an output stage;
   a PWM circuit;
   an impedance component, one terminal of the impedance component being coupled to the output terminal; and
   a simulation current signal generation circuit, comprising:
   a first current signal circuit, coupled to the other terminal of the impedance component, configured to provide a first current signal;
   a second current signal circuit, coupled to the output stage, configured to sense a current of a power switch in the output stage to provide a second current signal; and
   a switching circuit, coupled to the first current signal circuit, the second current signal circuit and the PWM circuit respectively, configured to selectively output the first current signal or the second current signal according to a PWM signal provided by the PWM circuit,
   wherein the impedance component is a resistor and the first current signal is a simulated current signal.

8. The power conversion circuit of claim 7, further comprising:
   an output inductor, coupled between the output stage and the output terminal and matching the impedance component.

9. The power conversion circuit of claim 7, wherein another power switch of the output stage and the power switch are coupled in series between an input voltage and a ground terminal and controlled by a switch control signal related to the PWM signal to be turned on alternately.

10. The power conversion circuit of claim 9, wherein when the power switch is turned on, the switching circuit outputs the second current signal; when the another power switch is turned on, the switching circuit outputs the first current signal.

11. The power conversion circuit of claim 7, wherein the first current signal circuit comprises a voltage follower and a current mirror circuit and configured to generate the first current signal with current-type to the switching circuit according to an input voltage and an output voltage of the output terminal.

12. The power conversion circuit of claim 7, wherein the first current signal circuit comprises a voltage follower and configured to generate the first current signal with voltage-type to the switching circuit according to an input voltage and an output voltage of the output terminal.

* * * * *